United States Patent [19]
Sommer

[11] Patent Number: 5,308,111
[45] Date of Patent: May 3, 1994

[54] INFLATABLE RESTRAINT HAVING AN IMPROVED TETHER

[75] Inventor: James J. Sommer, Tipp City, Ohio

[73] Assignee: General Motors Corporation, Detroit, Mich.

[21] Appl. No.: 10,801

[22] Filed: Jan. 29, 1993

[51] Int. Cl.$^5$ .............................................. B60R 21/20
[52] U.S. Cl. ................................ 280/728 B; 280/732
[58] Field of Search ........... 280/728 R, 728 A, 728 B, 280/730 R, 732, 743; 220/375

[56] References Cited

U.S. PATENT DOCUMENTS

| | | | |
|---|---|---|---|
| 2,899,103 | 8/1959 | Ebert | 220/375 |
| 4,878,689 | 11/1989 | Mitzkus et al. | 280/728 B |
| 4,893,833 | 1/1990 | DiSalvo et al. | 280/728 B |
| 4,911,471 | 3/1990 | Hirabayashi | 280/732 |

FOREIGN PATENT DOCUMENTS 598340  5/1925  France ................ 220/375

*Primary Examiner*—Karin L. Tyson
*Attorney, Agent, or Firm*—Charles E. Leahy

[57] ABSTRACT

An improved supplemental inflatable restraint for use in an automobile is disclosed having a single tether for hingeably securing a cover door in a deployment aperture of an instrument panel. The tether comprises a pair of folded portions defined by a plurality of predetermined fold lines including at least two non-parallel fold lines. The tether controls the deployment of the cover door such that it is deployed in a predetermined direction and at a predetermined velocity.

7 Claims, 9 Drawing Sheets

INFLATABLE RESTRAINT HAVING AN IMPROVED TETHER

BACKGROUND OF THE INVENTION

1. Field of the Invention

This invention relates generally to a supplemental inflatable restraint and, more particularly, to a passenger side supplemental inflatable restraint having an improved hinge or tether for securing a deployment door in an instrument panel of an automobile.

2. Description of Related Art

In the past, supplemental inflatable restraints have been used in automobiles in order to protect passengers riding in the automobiles. Conventional supplemental inflatable restraints comprise a restraint module which houses an inflatable air bag and an inflator which is mounted underneath an instrument panel in the automobile. The instrument panel comprises a deployment opening which is conventionally closed by a deployment or cover door which is mounted to the instrument panel.

It is known in the prior art to secure the cover door to the instrument panel by a plurality of tethers. In the past, the tethers were typically flexible elastic straps which were mounted between the cover door and the instrument panel. The tethers would typically have to be secured to the instrument panel and the cover door using a plurality of metallic anchors and reinforcement pieces. When the cover door reached the end of its tether, a substantial traction force was applied to the anchors and reinforcement pieces which, in turn, may cause damage to both cover door and instrument panel.

It would be desirable to provide an improved supplemental inflatable restraint which would eliminate the number of tethers required and eliminate the need for reinforcement.

It would also be desirable to provide an improved tether which can assist in holding the cover door down in a closed position.

SUMMARY OF THE INVENTION

It is therefore a primary object of the present invention to provide a tether which will control the velocity, momentum and displacement of the deployment of the cover door, thereby reducing or eliminating any damage to the instrument panel and cover door.

In one aspect, this invention comprises a door assembly for mounting in an opening of an air bag compartment in an instrument panel of an automobile, the door assembly comprising a door; and a tether for securing the door in the opening; said tether being capable of controlling the velocity and movement of said door and the deployment of an air bag when the air bag is deployed through said opening.

It is another object of this invention to provide a tether which will reduce or eliminate the need for reinforcement parts of the type required by elastic tethers.

It is yet another object of this invention to provide a tether which is capable of holding the cover door down in a closed position.

It is still another object of this invention to provide a tether whose design can be varied in width, thickness and ductility in order to control the velocity and opening force of the cover door.

Still another object of this invention is to reduce the amount of time required to assemble the supplemental inflatable restraint.

These objects, and others, may be more readily understood in connection with the following specification, claims and drawing.

DETAILED DESCRIPTION OF THE INVENTION

Figure 1:
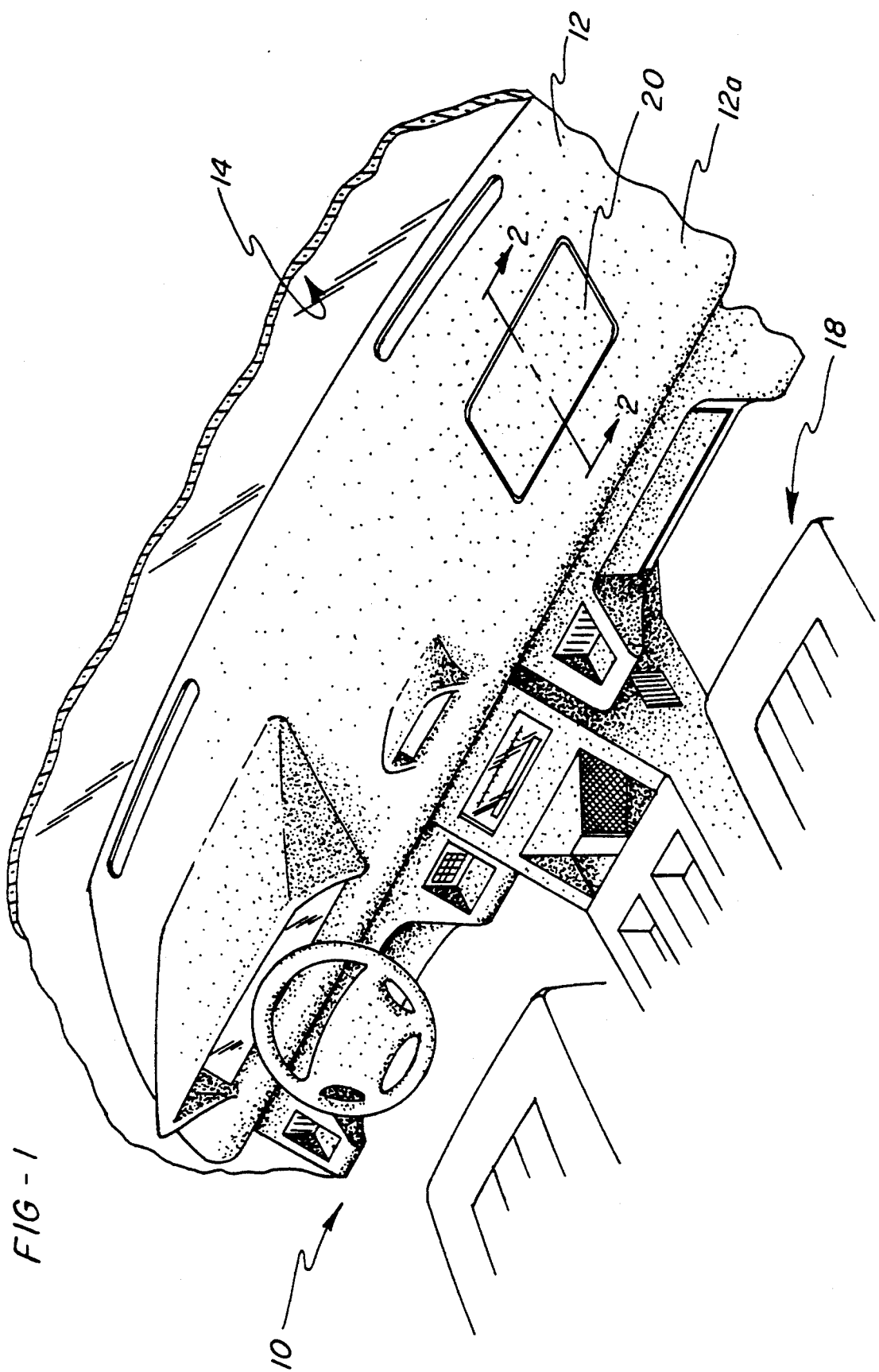
FIG. 1 is a partial perspective view of an automobile, illustrating the location of a cover door for a passenger side supplemental inflatable restraint which is mounted in the top surface of an instrument panel adjacent the vehicle windshield.

FIG. 1 shows a partial perspective view of an automobile 10 comprising an instrument panel 12 and windshield 14. The automobile 10 comprises a supplemental inflatable restraint 16 (FIG. 2) according to a preferred embodiment of this invention. The supplemental inflatable restraint 16 is associated with a passenger side, designated generally as 18 (FIG. 1), of the automobile 10.

Figure 2:
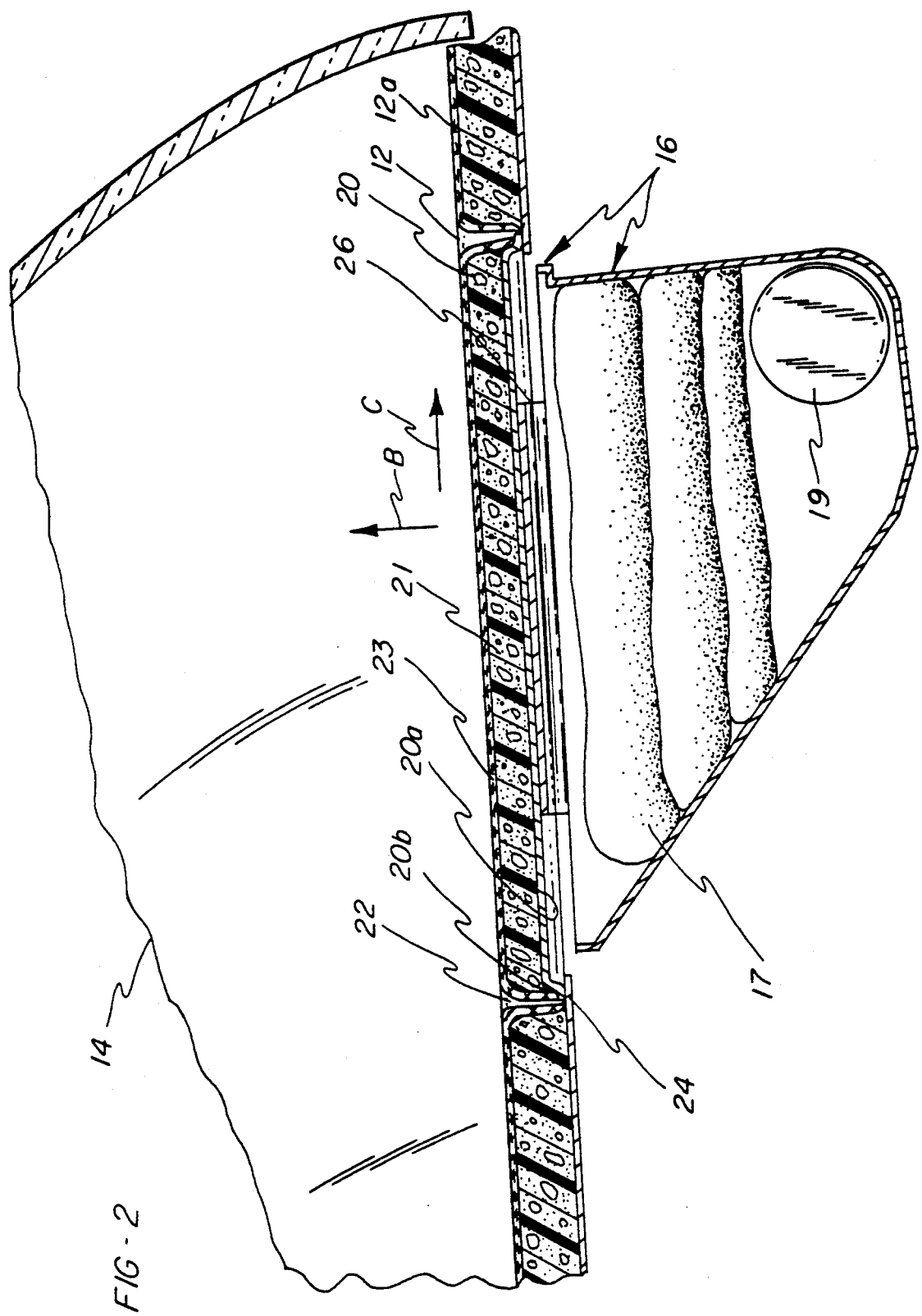
FIG. 2 is an enlarged sectional view, taken along the line 2—2 of FIG. 1, illustrating the cover door, air bag, inflator, and tether prior to deployment.

As best shown in FIG. 2, the supplemental inflatable restraint 16 comprises an air bag 17, inflator 19, a panel or cover door 20, and a hinge recess or tether 26 for hingedly securing the cover door 20 to the instrument panel 12.

The cover door 20 is positioned in an upper surface 12a of instrument panel 12, as shown in FIG. 1. The cover door 20 has a lower surface 20a (FIG. 3) which supports a foam layer 21 and an outer decorative skin 23 which is preferably identical to an outer decorative skin 13 on instrument panel 12.

In the embodiment being described, the instrument panel 12 comprises a generally rectangular opening or deployment aperture 22 for receiving the cover door 20. The deployment aperture 22 may have a flange or seat 24 for receiving a bottom edge 20b of the cover door 20 in order to support the cover door 20 so that the upper surface 12a is generally flush with an upper surface 20c of cover door 20 when the cover door 20 is received on the instrument panel 12. It is to be noted that while cover door 20 is received in the deployment aperture 22, it is not integrally formed as part of the instrument panel 12 and, therefore, is completely removable from the deployment aperture 22 in a manner described later herein.

In the embodiment being described, the hinge means or tether 26 mentioned above is formed such that it is capable of controlling the velocity of the cover door 20 when the air bag 17 is deployed through the deployment aperture 22. The tether 26 is also capable of controlling the direction in which the cover door 20 is deflected so that the cover door 20 is deflected in substantially upward (indicated by arrow B in FIG. 2) and forward (indicated by arrow C in FIG. 2) directions.

Figure 3:
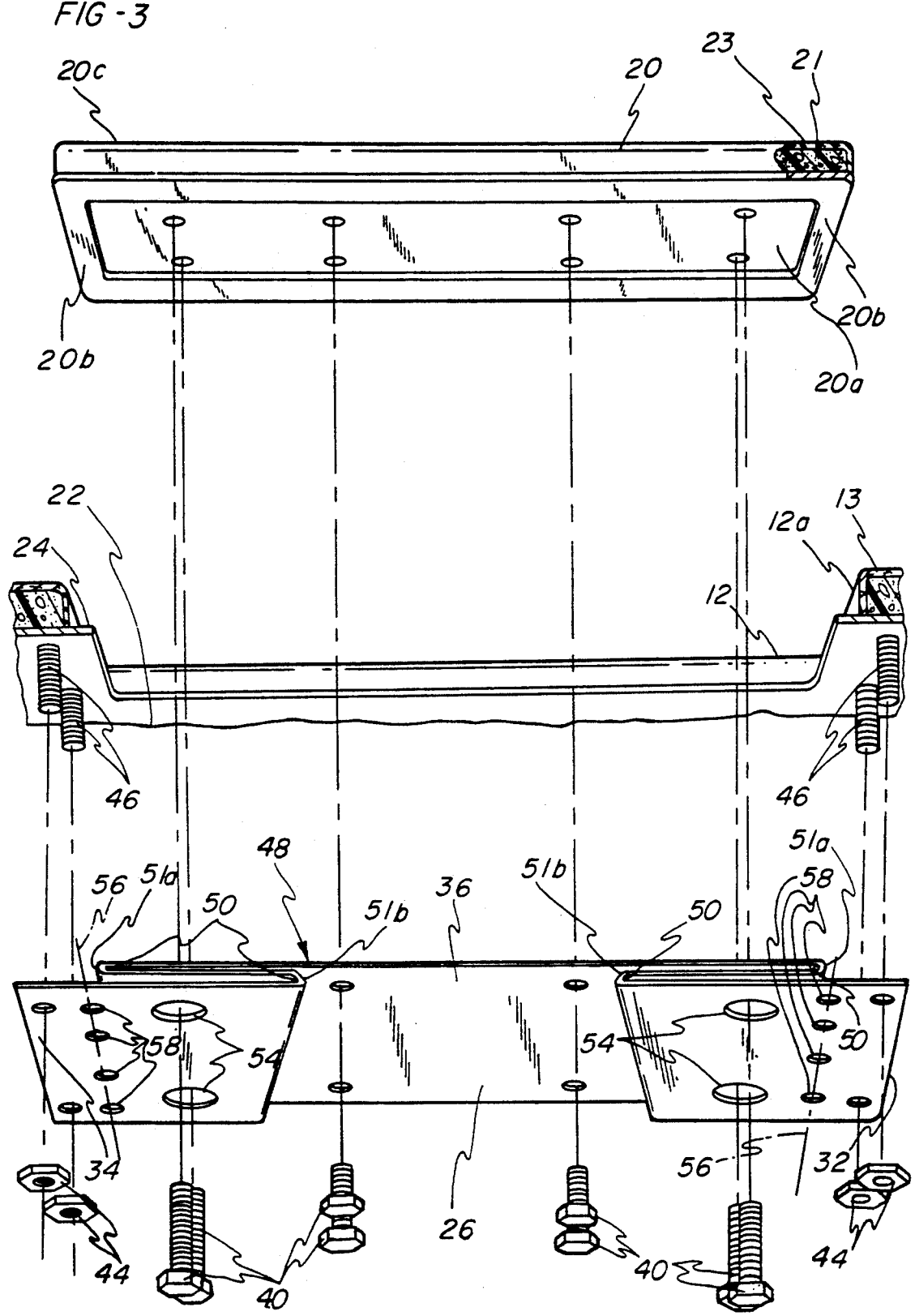
FIG. 3 is an exploded fragmentary view, partly in section, showing a one-piece tether for hingedly securing the cover door to the instrument panel.

The tether 26 comprises a first end portion 32, a second end portion 34 and a central portion 36. As best illustrated in FIG. 3, the central portion 36 is secured to the lower surface 20a of the cover door 20 using a plurality of screws or bolts 40. Although not shown, the central portion 36 could be integrally formed into cover door 20 by overlaying layers of polystyrene or some similar substrate material.

Figure 5:
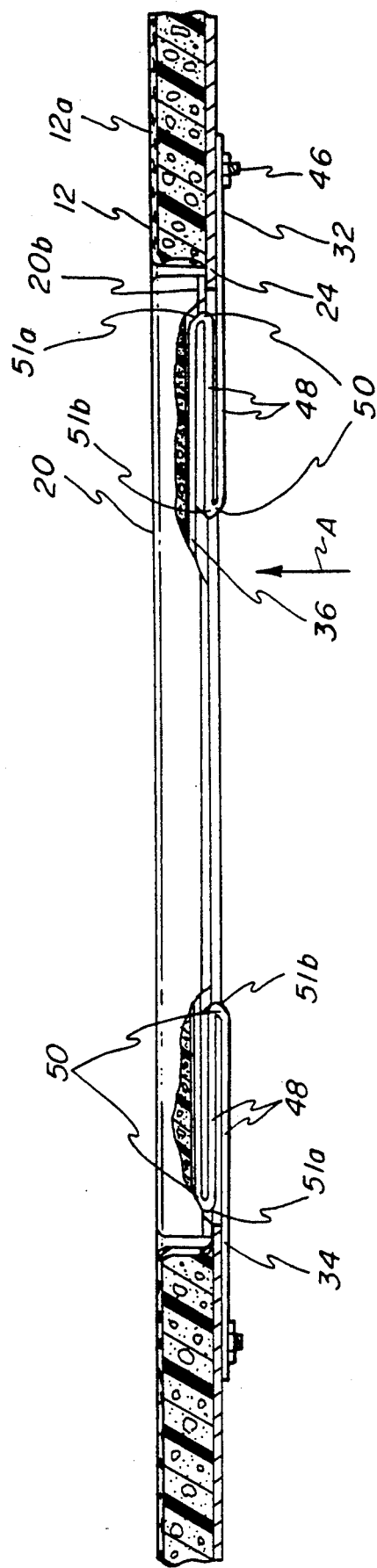
FIG. 5 is an enlarged sectional view, partly broken away, showing the cover door in a closed position.

The first and second end portions 32 and 34 are secured to instrument panel 12 with nuts 44 which are fastened to bolts 46 which are integrally formed as part of the instrument panel 12. It is to be noted that after the tether 26 is secured to the cover door 20 and the instrument panel 12, the lower surface 20b of cover door 20 is received on the flange 24 and the upper surface 20c of cover door 20 is generally flush with upper surface 12a of instrument panel 12, as best shown in FIG. 5. Thus, the tether 26 secures the cover door 20 in a closed position, as best shown in FIGS. 2 and 5.

Figure 4:
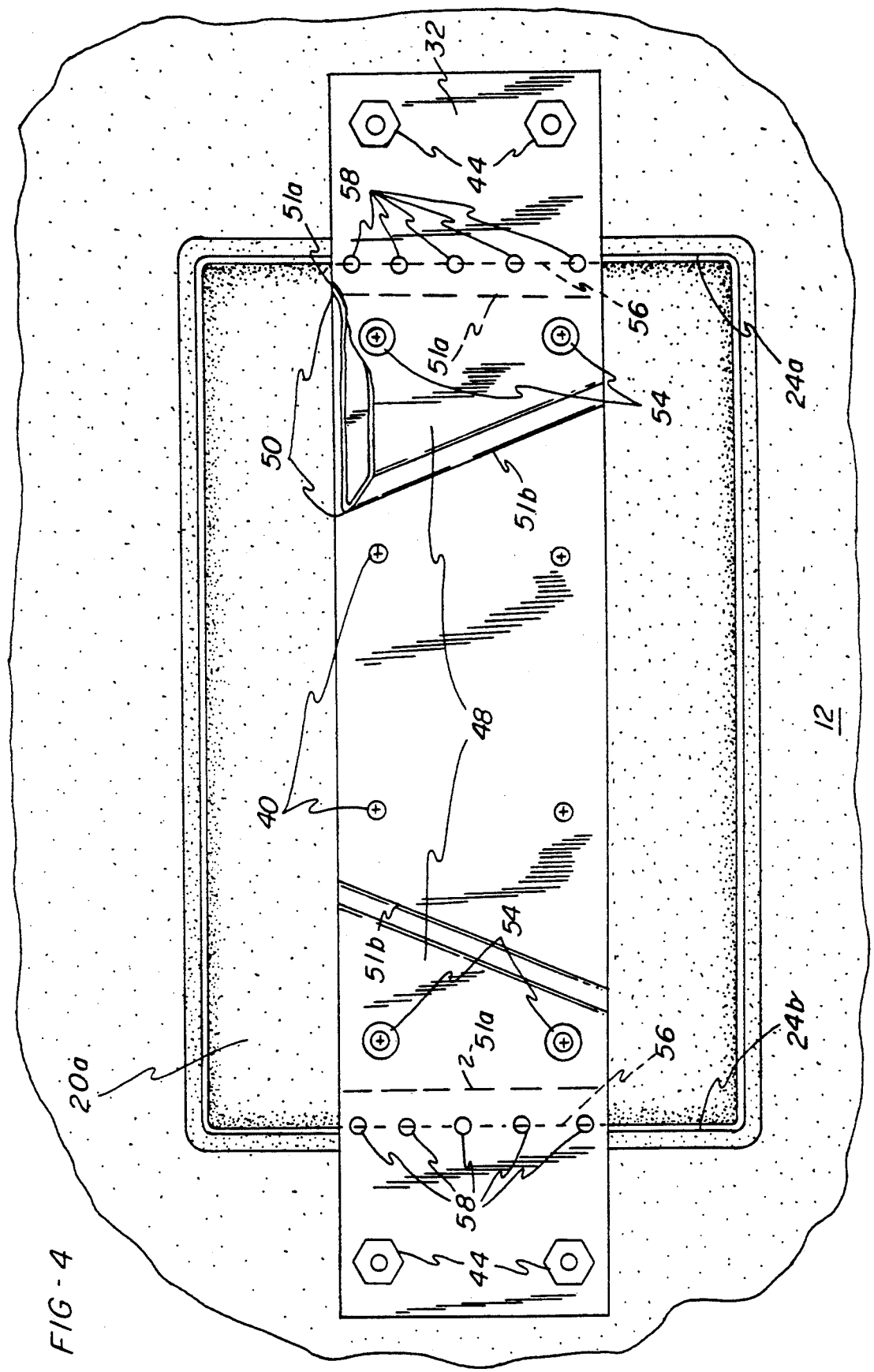
FIG. 4 is a fragmentary view, taken in the direction of arrow A in FIG. 5, showing the tether mounted to the cover door and instrument panel.
Figure 6:
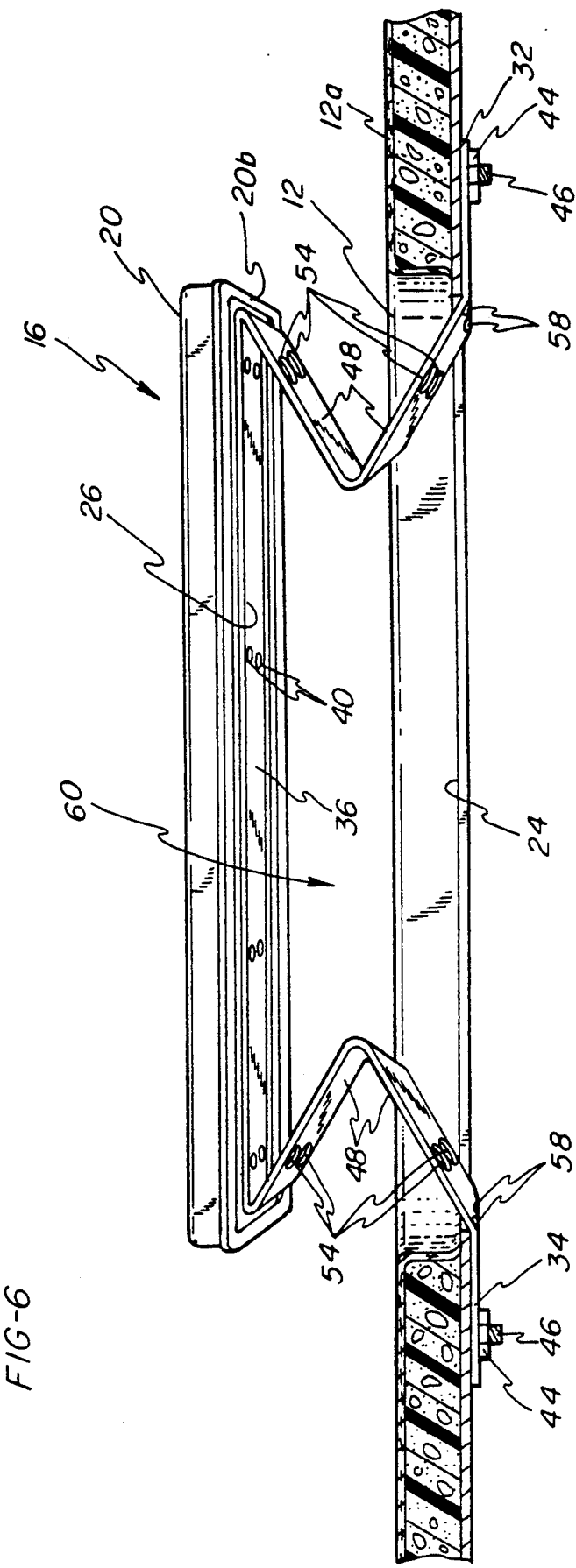
FIG. 6 is an enlarged sectional view, showing the cover door and tether approximately halfway through its deployment.

As best shown in FIG. 3, the first and second end portions 32 and 34 each comprise a folded portion, designated generally as 48. The folded portion 48 comprises a plurality of predetermined folds 50 which cause the tether 26 to deform in a predetermined manner and at predetermined velocity upon the deployment of the air bag 17. In the embodiment being described, the cover door 20 deploys angularly so that the lower surface 20a is angled towards the passenger side 18 (FIG. 1) in the manner shown in FIGS. 6-8. Referring further to FIG. 3, the folded portion 48 comprises a plurality of predetermined non-parallel fold lines 51a and 51b. It is to be noted that the predetermined fold lines 51a and 51b facilitate causing the tether 26 to unfold at the predetermined velocity and to move in the direction of arrows B and C (FIG. 2), which, in turn, causes the cover door 20 to be deployed to a position generally parallel to, but not contacting, the windshield 14. As best shown in FIGS. 4 and 6, the plurality of predetermined folds 50 have a plurality of apertures 54 to facilitate securing the bolts 40 to the cover door 20. While the embodiment being described herein shows a pair of predetermined fold lines 51a and 51b, it should be appreciated that there could be a greater or fewer number of fold lines if desired.

In the embodiment being described, the first and second end portions 32 and 34 also comprise means for facilitating bending the tether 26 along a pair of imaginary or predetermined fold lines 56 (FIGS. 3 and 4). In the embodiment being described, the means comprises a plurality of perforations 58, but it could comprise any suitable means for providing a line of weakness, such as a groove or score line (not shown). The plurality of perforations 58 facilitate causing the tether 26 to bend along edges 24a and 24b (FIG. 4) of flange 24 such that the cover door 20 is deployed in the predetermined manner mentioned earlier herein.

The operation of the supplemental inflatable restraint 16 will now be described. Upon the detection of a threshold deceleration, the inflator 19 (FIG. 2) is actuated in a conventional manner and the air bag 17 begins inflating. The inflating air bag 17 exerts an increasing force on the cover door 20. The cover door 20 begins deployment from a closed position shown in FIGS. 1, 2 and 5 to an open position shown in FIGS. 6-8. As the cover door 20 begins opening, the folded portions 48 on the first and second end portions 32 and 34 begin unfolding along the predetermined fold lines 51a and 51b and along the predetermined fold lines 56. As the tether 26 continues unfolding, the cover door 20 and folded portions 48 on the first and second end portions 32 and 34 provide a chute 60 (FIGS. 6 and 9) which opens towards the passenger side 18. The inflating air bag 17 continues deploying upwardly through the chute 60 in the manner shown in FIG. 8. Notice that the air bag 17 deploys away from the deployment aperture 22 and towards the passenger area 18 (FIG. 1) as the cover door 20 is deployed ahead of it.

Figure 7:
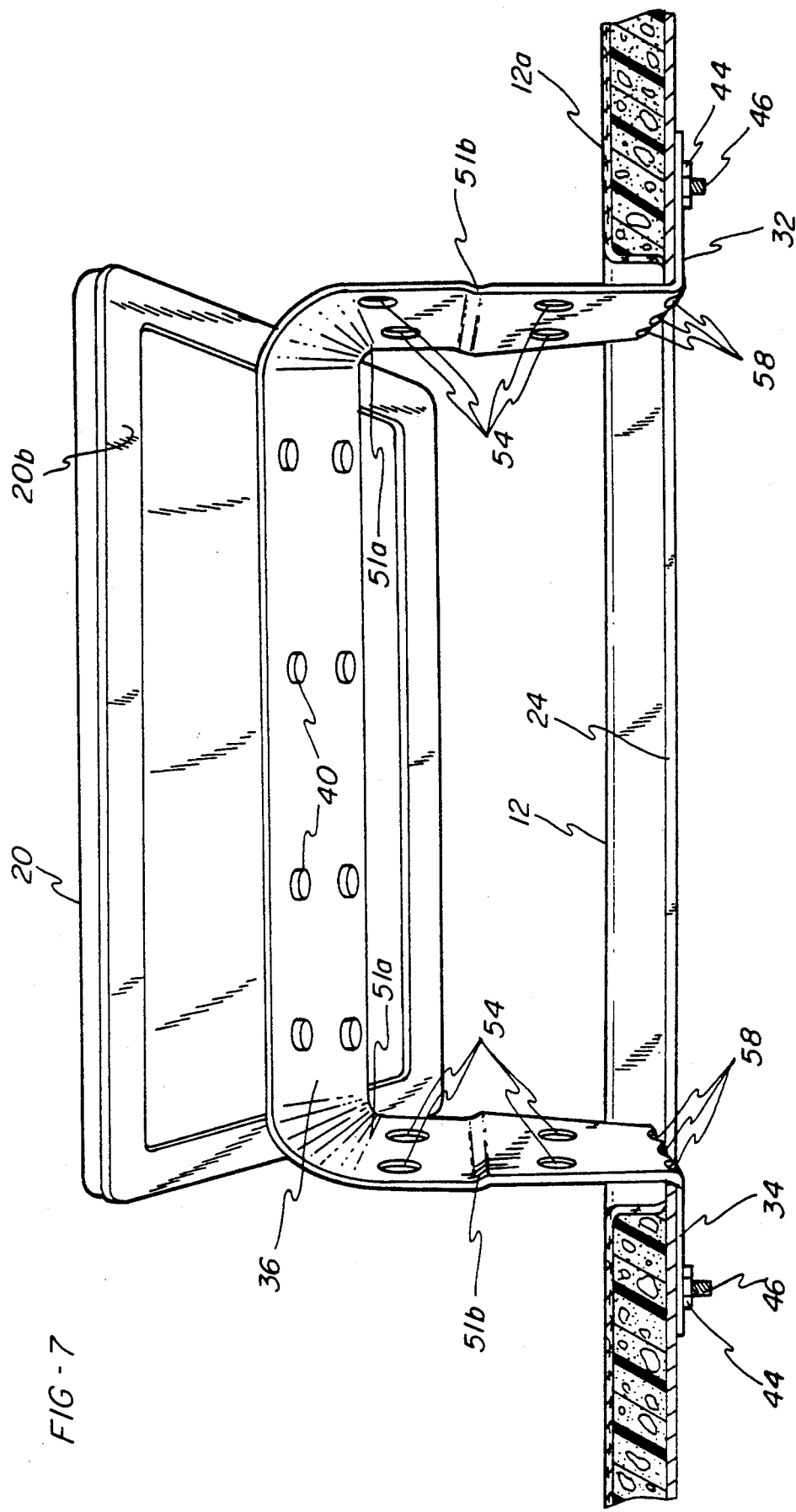
FIG. 7 is also an enlarged sectional view showing the cover door fully opened by the deploying air bag.
Figure 8:
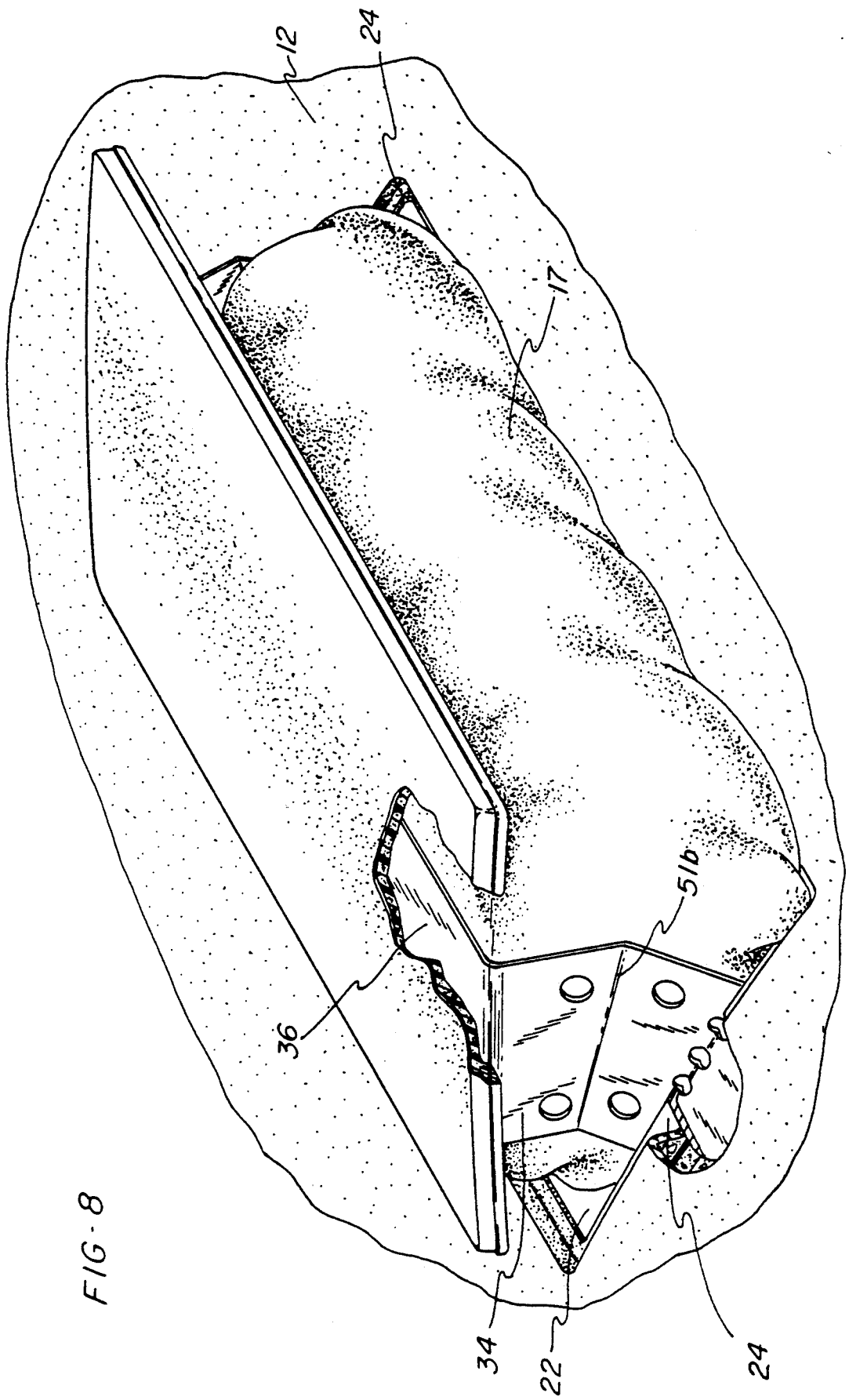
FIG. 8 is a perspective view, partly broken away, showing the open position similar to that shown in FIG. 5.
Figure 9:
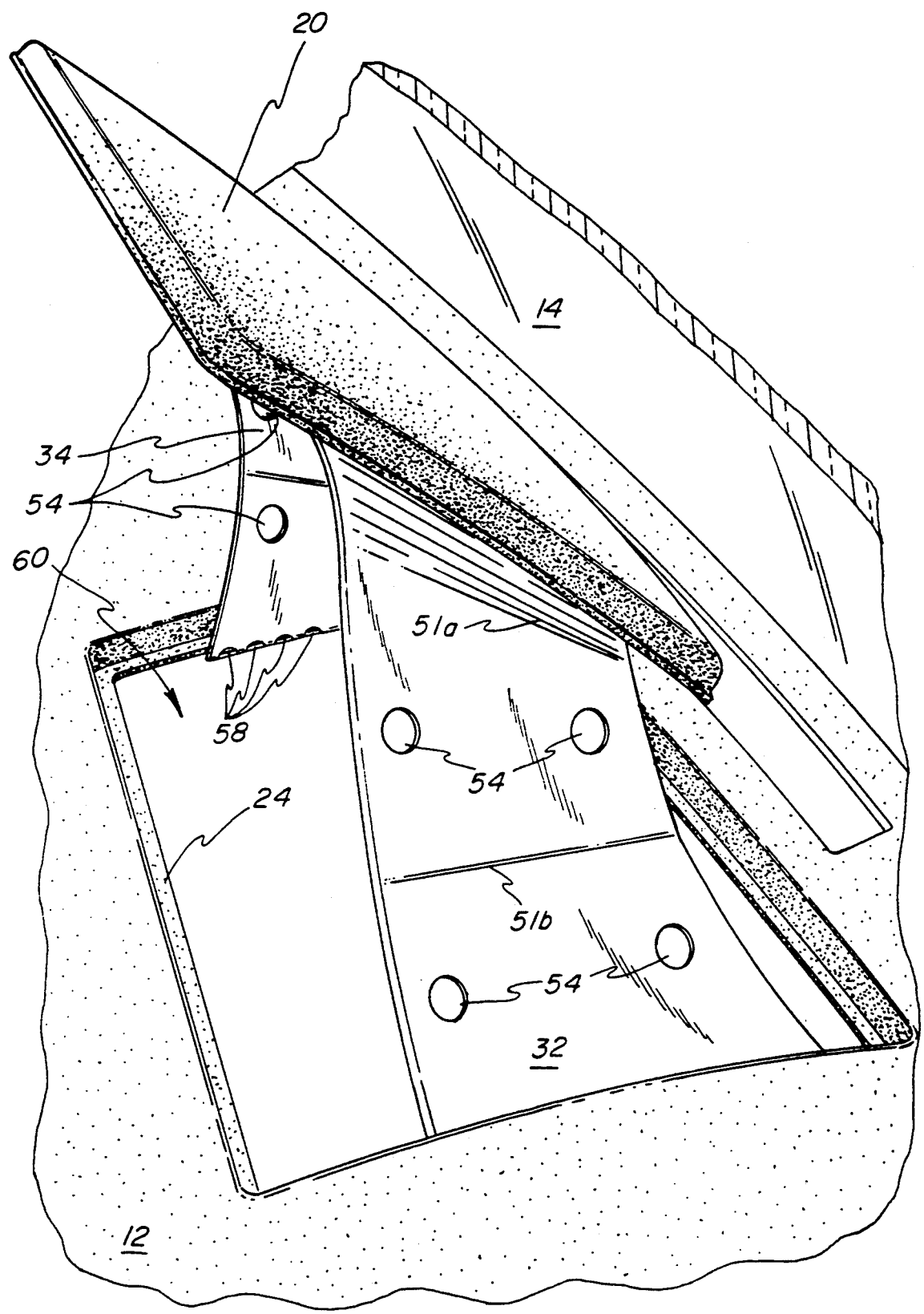
FIG. 9 is an enlarged fragmentary view showing the cover door in the fully open position.

This action will continue until the folded portions 48 on the first and second end portions 32 and 34 become fully extended, whereupon the cover door 20 will have reached the position shown in FIG. 7. As shown in FIG. 9, the cover door 20 is slightly spaced from the windshield 14 and is slightly angled toward the passenger area 18. This facilitates directing the air bag 17 towards the passenger area 18 and away from the windshield 14.

In the embodiment being described, the tether 26 is made of aluminum, but it could be made of any suitable metallic or non-metallic material which is capable of hingeably securing the cover door 20 in the manner described herein. Advantageously, the width, thickness and ductility of the material used to make the tether 26 can be varied to control the opening force and velocity of the cover door 7. The metallic tether 26 impedes the velocity of the cover door 20 so that the cover door 20 does not go beyond the tether 26. Reducing the velocity of the depolyment of the cover door 20 also facilitates minimizing the traction force applied to the instrument panel 12 (where the first and second end portions 32 and 34 are secured thereto) when the tether 26 reaches its end.

It should also be appreciated that the one-piece tether 26 is advantageous because it is easy to install and replace. As mentioned earlier herein, the one-piece tether 26 is also capable of holding the cover door 20 down in a closed position (FIGS. 2 and 5).

While the invention has been described with reference to a specific embodiment, these descriptions are merely illustrative and they are not to be construed as limiting the scope of the invention. Various modifications and changes may occur to those skilled in the art without departing from the spirit and scope of the invention as defined by the following claims.

What is claimed is:

1. A tether for securing a cover door in a deployment opening of an instrument panel in an automobile; said instrument panel having an air bag and an inflator for inflating said air bag located in operative relationship with said deployment opening, said tether comprising:

a first end portion for securing to said instrument panel;

a second end portion for securing to said instrument panel;

a central portion located between said first and second end portions for securing to said cover door;

and said first and second end portions each comprising a folded area where a portion of the tether comprises a plurality of predetermined folds including at least two non-parallel fold lines and causing the tether to deform into a predetermined shape when the air bag is deployed through the deployment opening.

2. The tether as recited in claim 1 wherein said tether is metallic.

3. The tether as recited in claim 1 wherein each of said first and second end portions comprise means for causing said tether to bend at a predetermined location in order to facilitate deploying said cover door away from said deployment opening to a predetermined position.

4. The tether as recited in claim 3 wherein said means comprises a plurality of perforations.

5. A supplemental inflatable restraint for use in an automobile comprising an instrument panel having a deployment aperture located on a passenger side of the instrument panel, comprising:

a panel door; and hinge means for hingeably securing said door to said instrument panel, said hinge means being capable of controlling the velocity and direction of said door and the deployment of an air bag when said air bag is deployed through said deployment aperture;

said hinge means comprising a first end portion, a second end portion and a central portion; said central portion being secured to said door and said first and second end portions being secured to said instrument panel such that said door is mounted on said instrument panel in said deployment aperture;

and said hinge means comprising a metallic tether; said first and second end portions each comprise a folded portion; said folded portion having a plurality of predetermined folds including at least two non-parallel fold lines which cause said tether to deform in a predetermined manner upon the deployment of the air bag.

6. The supplemental inflatable restraint as recited in claim 5 wherein each of said first and second end portions each comprise means for facilitating bending said tether along a predetermined fold line.

7. The supplemental inflatable restraint as recited in claim 6 wherein said means comprises a plurality of perforations.

* * * * *